United States Patent
Hildebrandt et al.

(10) Patent No.: US 8,168,684 B2
(45) Date of Patent: May 1, 2012

(54) CARBON EFFICIENCIES IN HYDROCARBON PRODUCTION

(75) Inventors: Diane Hildebrandt, Johannesburg (ZA); David Glasser, Johannesburg (ZA); Bilal Patel, Johannesburg (ZA); Brendon Patrick Hausberger, Johannesburg (ZA)

(73) Assignee: University of the Witwatersrand, Johannesburg, Johannesburg (ZA)

( * ) Notice: Subject to any disclaimer, the term of this patent is extended or adjusted under 35 U.S.C. 154(b) by 373 days.

(21) Appl. No.: 12/226,312

(22) PCT Filed: Apr. 24, 2007

(86) PCT No.: PCT/IB2007/001057
§ 371 (c)(1),
(2), (4) Date: Jul. 28, 2009

(87) PCT Pub. No.: WO2007/122498
PCT Pub. Date: Nov. 1, 2007

(65) Prior Publication Data
US 2009/0317669 A1      Dec. 24, 2009

(30) Foreign Application Priority Data
Apr. 24, 2006   (ZA) ................................. 2006/03239

(51) Int. Cl.
*C07C 27/00*      (2006.01)
(52) U.S. Cl. ........ 518/700; 518/702; 518/703; 518/704; 518/705
(58) Field of Classification Search ........... 518/700–705
See application file for complete search history.

(56) References Cited

U.S. PATENT DOCUMENTS 2,692,274 A * 10/1954 Kolbel et al. ................. 518/706
2005/0113463 A1    5/2005 O'Rear et al.
2007/0227069 A1* 10/2007 Norbeck et al. .................. 48/89

FOREIGN PATENT DOCUMENTS
WO    02/01855    1/2002

OTHER PUBLICATIONS

Damen et al., A comparison of electricity and hydrogen production systems with CO2 capture and storage. Part A: Review and selection of promising conversion and capture technologies, Progress in Energy and Combustion Science (2006), 32(2), 215-246.*
Office Action from Eurasian Patent Office dated Jul. 27, 2010 in corresponding Eurasian patent application No. 200970369/28 (English translation provided).
N.S. Zefirov, Khemicheskaya encyclopedia, 1998, v. 5, pp. 103-104 (No English translation available).
Riedel et al. "Comparative Study of Fischer-Tropsch Synthesis with $H_2/CO$ and $H_2/CO_2$ Syngas Using Fe- and CO-based Catalysts." Applied Catlysis A: General, vol. 186, Oct. 4, 1999, pp. 201-213.
Steynberg et al. "Fischer-Tropsch Technology: Chapter 3." Studies in Surface Science and Catalysis 152, 2004.
International Search Report dated Apr. 24, 2008.

* cited by examiner

*Primary Examiner* — Jafar Parsa
(74) *Attorney, Agent, or Firm* — Jacobson Holman PLLC

(57) ABSTRACT

This invention relates to a method of producing liquid hydrocarbons, preferably internal combustion engine fuels, using feedstocks of coal or methane. Depending on the nature of the feedstock it is subjected to a gasification and/or reforming process and/or water gas shift process which produces a syngas that is rich in carbon dioxide and hydrogen rather than carbon monoxide and hydrogen as in the conventional process. The carbon dioxide and hydrogen are combined in a Fischer Tropsch process to produce desired hydrocarbons and water. The energy requirements of the gasification/reforming process to produce a syngas that is rich in carbon dioxide and hydrogen is considerably less than the energy requirements for gasification/reforming process for producing the conventional carbon monoxide rich syngas. This reduction in energy consumption reduces considerably the quantities of carbon dioxide released into the atmosphere compared to conventional processes that are based on carbon monoxide rich syngas. Unreacted CO2-rich syngas can be recirculated or can also be used, in molten carbonate fuel cells, or to generate energy or steam in turbine processes such as IGCC.

16 Claims, 1 Drawing Sheet

CARBON EFFICIENCIES IN HYDROCARBON PRODUCTION

This is a national stage of PCT/IB07/001,057 filed Apr. 24, 2007 and published in English, which has a priority of South Africa no. 2006/03239 filed Apr. 24, 2006, hereby incorporated by reference.

FIELD OF THE INVENTION

This invention relates to improvements of carbon efficiencies, and reduction of carbon dioxide emissions in hydrocarbons produced by a Fischer-Tropsch process.

BACKGROUND TO THE INVENTION

The Fischer-Tropsch process is used primarily to convert carbon monoxide and hydrogen, also known as "syngas", into liquid hydrocarbons for use as fuel.

A typical process flow diagram where a Fisher-Tropsch process is used to synthesize hydrocarbons is as follows:

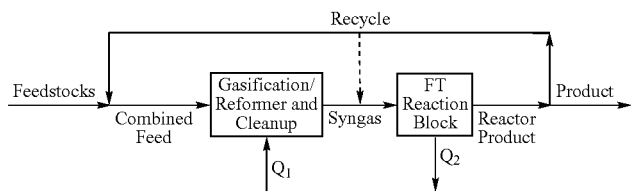

In the above process gasifier feedstocks are usually coal or methane gas. In this diagram $Q_1$ represents the energy input into the gasification (in the case of a coal feedstock) or reforming section (in the case of a methane gas) and $Q_2$ represents the energy output from the Fischer-Tropsch synthesis process.

Where coal is used as the feedstock it is, initially, converted to carbon monoxide (CO) and hydrogen gas ($H_2$) by the following gasification process:

$$C + H_2O \rightarrow CO + H_2$$

The carbon monoxide is then partially converted to carbon dioxide ($CO_2$) and hydrogen ($H_2$) by the following water gas shift process:

$$CO + H_2O \rightarrow CO_2 + H_2$$

The water gas shift process is controlled so as to provide the required $CO:H_2$ molar ratio for the Fischer-Tropsch process. Typically the $CO:H_2$ molar gas ratio is 1:2. The $CO_2$ produced in this way is emitted by the process and leads to carbon inefficiencies.

Where methane ($CH_4$) is used as the feed the reforming process is used:

$$CH_4 + H_2O \rightarrow CO + 3H_2$$

As in the case of the coal fed process the water gas shift process partially converts the carbon monoxide to carbon dioxide so as to provide the required $CO:H_2$ molar ratio of 1:2 for the Fischer-Tropsch process. The carbon dioxide created in this way is emitted by the process.

As indicated above, the CO and $H_2$ gas combination is termed "syngas" and it can be used in the Fischer-Tropsch process to produce a wide range of carbon based chemicals perhaps the most important of which is fuel for internal combustion engines.

Syngas production processes are endothermic and, consequently, require considerable quantities of energy. This, also results in the emission of significant quantities of carbon dioxide which, because it is a so-called "greenhouse gas", militates against the above-described synthetic fuel plants. On the other hand, dwindling and increasingly expensive crude oil stocks, coupled with significantly large resources of natural gas and low grade coal, militate for the erection and operation of such plants.

It should be noted that the following terms, when used in this specification, have the following meanings:

1. By "carbon efficiency", it is meant the amount of carbon in all the feeds to the process (including all feed streams that provide energy) that occurs as carbon in the desired product; and
2. A "$CO_2$ rich syngas" is a gas mixture in which there is $CO_2$, $H_2$ and CO. The $CO_2$ composition in this mixture is in excess of the $CO_2$ which would usually occur in conventional syngas. The $CO_2$ is utilized as a reactant and is converted into the desired product.

OBJECT OF THE INVENTION

It is an object of this invention to provide an improvement of carbon efficiencies in hydrocarbon production with a consequent reduction of carbon dioxide emission.

SUMMARY OF THE INVENTION

In accordance with this invention there is provided a process for producing hydrocarbons from a $CO_2$— rich syngas produced from a suitable feedstock comprising reacting the $CO_2$— rich syngas in a Fischer Tropsch process to produce hydrocarbons according to the overall process mass balance:

$$CO_2 + 3H_2 \Rightarrow -CH_2- + 2H_2O.$$

There is also provided for a water gas shift process to be used, where necessary, to modify the $CO_2$ rich syngas and achieve a desired $CO_2$ concentration.

There is also provided for CO in the $CO_2$— rich syngas to be used to produce hydrocarbons according to the process:

$$CO + 2H_2 \Rightarrow -CH_2- + H_2O.$$

There is further provided for syngas to be produced by combination gasifier and reforming processes where more than one feedstock, preferably coal and natural gas or methane is used, alternatively gasifier processes only where a solid feedstock, preferably coal is used, further alternatively reforming processes only where a natural gas, preferably methane is used, in a gasifier/reformer.

There is further provided for the methane to be sourced from a natural gas reservoir or alternatively for the methane to be produced by microbial degradation of waste products.

There is also provided for energy input to the gasifier/reformer stage to be adjusted to move the chemical reactions in favour of $CO_2$ production, and for the $CO_2$ to be used in combination with hydrogen to form hydrocarbon compounds in the Fischer Tropsch process.

There is further provided for unreacted carbon dioxide, carbon monoxide and hydrogen to be recirculated, used to produce electricity and/or to generate steam.

The invention extends to the use of unconsumed, alternatively waste $CO_2$ and $H_2$ to be used in fuel cells, preferably molten carbonate fuel cells, to provide electrical energy.

BRIEF DESCRIPTION OF THE DRAWINGS

The invention will be described below by way of example only and with reference to the drawings in which.

DETAILED DESCRIPTION OF THE DRAWINGS

Figure 1:
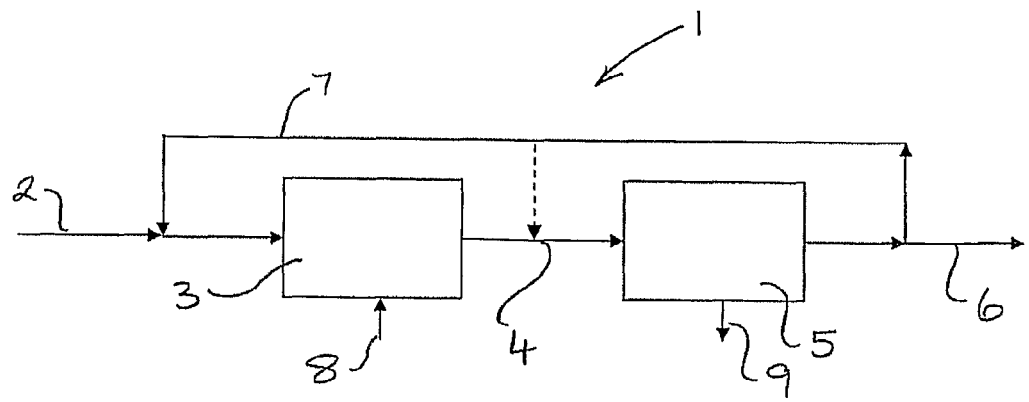
FIG. 1 is a schematic diagram of a Fisher Tropsch reactor according to one embodiment of the invention.

Referring to FIG. 1, a Fischer Tropsch process (1) for producing hydrocarbons comprises a feedstock inlet (2) into which a feedstock is fed into a gasifier/reforming process (3) where the feedstock is converted into $CO_2$ rich syngas (4) to a Fischer Tropsch synthesis section (5) where it is converted into Fischer Tropsch process products which are preferably a liquid hydrocarbon and water. Unreacted gas or undesirable gas products may be recycled back to the gasifier/reforming process or to the feed to the Fischer Tropsch synthesis section (7).

Where coal is used as a feedstock it is processed to produce carbon monoxide and hydrogen. This gasification process is as follows:

$$C+H_2O \rightarrow CO+H_2.$$

Where methane from a natural gas source is used as the feedstock it is converted into carbon monoxide and hydrogen by a reforming process which is as follows:

$$CH_4+H_2O \rightarrow CO+3H_2.$$

The carbon monoxide from either process is then partially converted to carbon dioxide and hydrogen by the following water gas shift process:

$$CO+H_2O \rightarrow CO_2+H_2.$$

All of the above reactions occur in the gasifier/reforming process (3) and the concentration of carbon dioxide can be altered to suit particular requirements by altering the operating conditions of the gasification/reforming process.

The syngas produced in the gasifier/reforming process (3) is piped to a Fischer Tropsch synthesis section (5) where it is, at least partially converted into a hydrocarbon which, depending on the kinetics of the reaction, can be suitable for use as a fuel for internal combustion engines, as a lubricating oil or as a floor polish to name but a few products. The Fischer Tropsch process using, primarily carbon dioxide and hydrogen, is as follows:

$$CO_2+3H_2 \rightarrow -CH_2-+2H_2O.$$

Carbon monoxide in the $CO_2$ rich syngas can be reacted with hydrogen to produce hydrocarbons as follows:

$$CO+2H_2 \rightarrow -CH_2-+H_2O.$$

Unreacted carbon dioxide, carbon monoxide and hydrogen may be recirculated from the Fischer Tropsch synthesis section (5) into the gasifier/reforming process stage (3) via a conduit (7) or back to the Fischer Tropsch synthesis section.

The energy requirements for the gasification/reforming process (8) are considerably reduced by producing a $CO_2$ rich syngas rather than a CO rich syngas as in the conventional process.

In addition to the above and unreacted carbon dioxide, carbon monoxide and hydrogen can be used to generate electricity and/or steam in for example and IGCC process.

Figure 2:
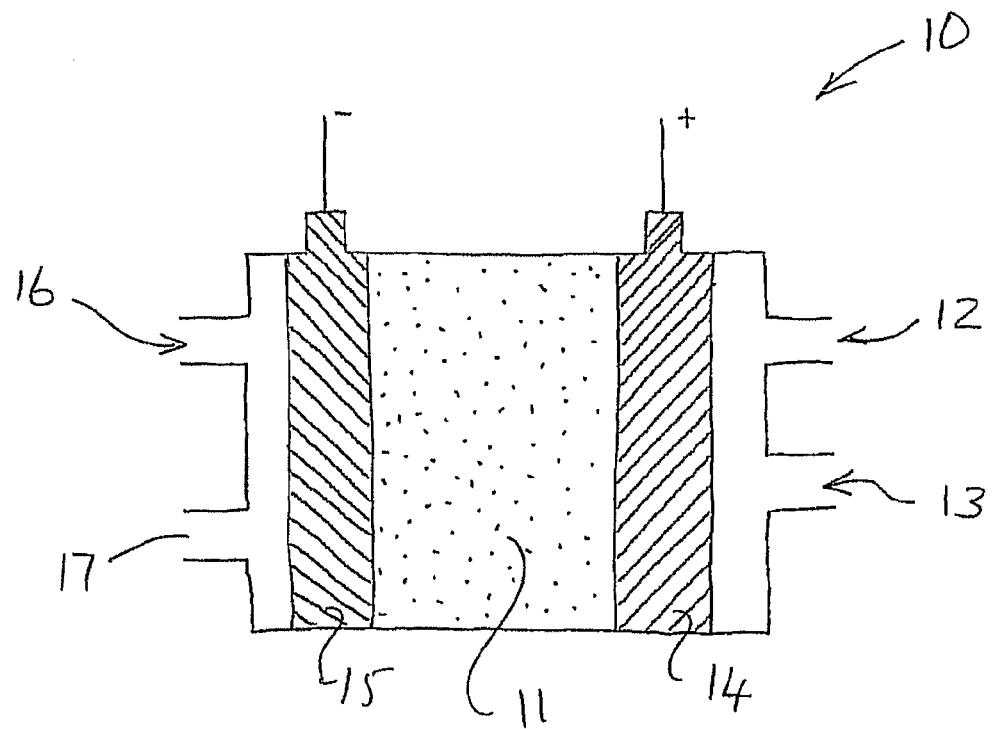
FIG. 2 is a schematic diagram of one embodiment of a molten carbonate fuel cell capable of using excess or waste $CO_2$ and $H_2$ to produce electrical energy.

In addition to the above and referring to FIG. 2, excess or waste carbon dioxide and hydrogen can be used in a molten carbonate fuel cell (10). This fuel cell (10) uses high-temperature compounds of salt like sodium or magnesium as the electrolyte (11). Oxygen (12) and carbon dioxide (13) are fed into the cell (10) at the cathode (14) end where they are converted into carbon trioxide which migrates to the anode (15) end of the cell (10) into which hydrogen (16) is fed as an electron donor. The resulting reaction produces water (17) at the anode (15) end of the cell.

As carbonate ions from the electrolyte are used up in the reactions it is necessary to inject carbon dioxide into the cell to compensate for this consumption.

It is envisaged that the above alternative to the conventional Fischer Tropsch process for producing synthetic carbon products from $CO_2$-rich syngas and conventional processes for producing syngas produce significantly less carbon dioxide which is emitted into the atmosphere and are thus more environmentally friendly.

Data

The following table provides data on the required feed as well as the products produced in both a conventional Fischer Tropsch process based on CO-rich syngas as well as the process considered in this patent based on $CO_2$-rich syngas. The feed considered was coal. The carbon dioxide emissions and carbon efficiencies of the two processes are also provided.

Production of 1 Ton of Hydrocarbons from a Coal Feedstock

| Conventional Process: CO-rich syngas | | |
|---|---|---|
| | Feed (Tons) | Product (Tons) |
| Section 1 - Gasification | | |
| Coal (Carbon) | 1.29 | |
| Water | 1.93 | |
| Carbon Monoxide | | 3 |
| Hydrogen | | 0.43 |
| Carbon Dioxide produced from Energy input | | 1.57 |
| Section 2 - Fischer Tropsch Synthesis | | |
| Carbon Monoxide | 3 | |
| Hydrogen | 0.43 | |
| Hydrocarbons | | 1 |
| Carbon Dioxide | | 1.57 |
| Water | | 0.64 |
| Total Carbon Dioxide Emissions | | 3.14 |
| Carbon Efficiency | | 50% |

| Alternative Process: $CO_2$-rich syngas | | |
|---|---|---|
| | Feed (Tons) | Product (Tons) |
| Section 1 - Gasification | | |
| Coal (Carbon) | 1.29 | |
| Water | 3.86 | |

-continued

| Alternative Process: $CO_2$-rich syngas | | |
|---|---|---|
| | Feed (Tons) | Product (Tons) |
| Carbon Dioxide | 4.71 | |
| Hydrogen | 0.86 | |
| Carbon Dioxide produced from Energy input | | 1.08 |
| Section 2 - Fischer Tropsch Synthesis | | |
| Carbon Dioxide | 4.71 | |
| Hydrogen | 0.86 | |
| Hydrocarbons | | 1 |
| Carbon Dioxide | | 1.57 |
| Water | | 2.57 |
| Total Carbon Dioxide Emissions | | 2.65 |
| Carbon Efficiency | | 54% |

These calculations are based on idealized targets for the process and it is envisaged that a person skilled in the art will be able to adapt the processes to suit particular conditions and desired outputs. In addition it should be appreciated that alternative feeds can be used instead of or in conjunction with coal. Examples of such alternative feeds include methane-rich natural gas derived from natural gas deposits or generated by fermentation of natural waste dumps.

The invention claimed is:

1. A process for producing hydrocarbons comprising the steps of:
    producing a syngas which is rich in $CO_2$ from a suitable feedstock; and
    reacting the $CO_2$-rich syngas and $H_2$ therein in a Fischer Tropsch process to produce hydrocarbons according to the overall process mass balance:

$$CO_2 + 3H_2 \Rightarrow -CH_2- + 2H_2O$$

thereby reducing $CO_2$ emissions and energy consumption and increasing carbon efficiency of known Fischer-Tropsch processes.

2. The process as claimed claim 1 which includes using a water gas shift process, where necessary, to modify the $CO_2$-rich syngas and achieve a desired $CO_2$ concentration.

3. The process as claimed in claim 1 in which CO in the $CO_2$-rich syngas is also used to produce hydrocarbons according to the process:

$$CO + 2H_2 \Rightarrow CH_2- + H_2O.$$

4. The process as claimed in claim 1 in which the feedstocks are coal and natural gas or methane.

5. The process as claimed in claim 1 in which the syngas is produced by gasifier processes only where a solid feedstock is used.

6. The process as claimed in claim 5 in which the solid feedstock is coal.

7. The process as claimed in claim 1 in which the syngas is produced by reforming processes only where a natural gas is used.

8. The process as claimed in claim 7 in which the gas is methane.

9. The process as claimed in claim 8 in which the methane is sourced from a natural gas reservoir.

10. The process as claimed in claim 8 in which the methane is produced by microbial degradation of waste products.

11. The process as claimed in claim 1 in which unreacted carbon dioxide, carbon monoxide and hydrogen are recirculated to the gasifier or reformer.

12. The process as claimed in claim 1 in which unreacted carbon dioxide and hydrogen are used to produce electricity.

13. The process as claimed in claim 1 in which unreacted carbon dioxide, carbon monoxide and hydrogen are used to generate steam.

14. The process as claimed in claim 12 in which unreacted carbon dioxide and hydrogen are used in fuel cells to produce electricity.

15. The process as claimed in claim 14 in which the fuel cells are molten carbonate fuel cells.

16. The process for producing electricity from carbon dioxide and hydrogen produced by a process as claimed in claim 1.

* * * * *

UNITED STATES PATENT AND TRADEMARK OFFICE
CERTIFICATE OF CORRECTION

PATENT NO. : 8,168,684 B2  
APPLICATION NO. : 12/226312  
DATED : May 1, 2012  
INVENTOR(S) : Diane Hildebrandt et al.

It is certified that error appears in the above-identified patent and that said Letters Patent is hereby corrected as shown below:

Column 5, line 37, add the following text after "Tropsch process": "wherein syngas is produced by combination of gasifier and reforming processes where more than one feedstock is used and the CO2-rich syngas is produced by adjusting the energy which is output into a gasifier or reformer which produces the syngas so as to move the chemical reactions in favor of CO2 production.".

Column 6, line 8 to 21, delete claims 5 through 10.

Column 6, line 22, replace claim reference numeral "11" with "5".

Column 6, line 25, replace claim reference numeral "12" with "6".

Column 6, line 27, replace claim reference numeral "13" with "7".

Column 6, line 30, replace the text "14. The process as claimed in claim 12 in which unreacted" with "8. The process as claimed in claim 6 in which unreacted".

Column 6, line 33, replace the text "15. The process as claimed in claim 14 in which the fuel" with "9. The process as claimed in claim 8 in which the fuel".

Column 6, line 35, replace claim reference numeral "16" with "10".

Signed and Sealed this  
Fourth Day of September, 2012

David J. Kappos  
*Director of the United States Patent and Trademark Office*